United States Patent
Lunsford

[11] 3,922,540
[45] Nov. 25, 1975

[54] APPROXIMATOR FOR SQUARE ROOT OF SUMS OF SQUARES

[75] Inventor: John Albert Lunsford, Willingboro, N.J.

[73] Assignee: RCA Corporation, New York, N.Y.

[22] Filed: Oct. 29, 1974

[21] Appl. No.: 518,717

[52] U.S. Cl. .............. 235/193.5; 235/158; 235/192
[51] Int. Cl.² ... G06F 7/38; G06G 7/20; G06G 7/22
[58] Field of Search ........ 235/193.5, 186, 189, 158, 235/151.31, 152, 151.11, 192

[56] References Cited
UNITED STATES PATENTS

| | | | |
|---|---|---|---|
| 3,505,506 | 4/1970 | Kostalos, Jr. | 235/151.31 |
| 3,633,013 | 1/1972 | Dummermuth | 235/151.11 |
| 3,829,671 | 8/1974 | Gathright et al. | 235/158 |

Primary Examiner—Joseph F. Ruggiero
Attorney, Agent, or Firm—Edward J. Norton; Carl M. Wright

[57] ABSTRACT

Circuit for approximating the value of $\sqrt{(I^2 + Q^2)}$ using max $(I + Q/4,\ 3(I + Q)/4,\ Q + I/4)$.

5 Claims, 3 Drawing Figures

APPROXIMATOR FOR SQUARE ROOT OF SUMS OF SQUARES

The invention described herein was made in the course of or under a contract or a subcontract thereunder with the Department of the Air Force.

BACKGROUND OF THE INVENTION

Calculating the square root of the sums of two squares applies to such applications as rectangular to polar conversions and finding the resultant of two signals in quadrature. Squaring the input values, summing the products, and extracting the square root of the sum involve complicated and time-consuming procedures. Such procedures are uneconomical to implement in signal processing equipment when the accuracy of the result is limited by degradations of signals caused by noise, round-off, and the like.

The invention described and illustrated herein minimizes the above-mentioned drawbacks by employing a circuit for approximating $\sqrt{(I^2 + Q^2)}$ by the greatest of $I + Q/4$, $3(I + Q)/4$, and $Q + I/4$, written usually as $\max(I + Q/4, 3(I + Q)/4, Q + I/4)$.

BRIEF DESCRIPTION OF THE INVENTION

The signals indicating two values are compared to produce a pair of signals that depend on the relative magnitudes of the values. A summer produces an output signal representing half of the sum of the first and second input signals. An output signal is produced in response to the outputs of the comparing means and summer which represents the value of the first signal plus one-fourth the second signal, the second signal plus one-fourth the first signal, or three-fourths the sum of the first and second signals, depending on the relationship of the magnitudes of the input signals.

DETAILED DESCRIPTION OF THE INVENTION

The linear approximation, $\max(I + Q/4, 3(I + Q)/4, Q + I/4)$, is used to approximate the value of $\sqrt{(I^2 + Q^2)}$. For purposes of explanation, the values of $I$ and $Q$ are understood to be absolute values, i.e., magnitudes. A typical application is a signal processing system, such as used in certain radar configurations, where in-phase ($I$) and quadrature ($Q$) signals are processed. The $I$ and $Q$ signals in a Fast Fourier Transform digital filtering network, for example, are processed separately and combined into a resultant. The values of $I$ and $Q$ are usually not exact because of noise, truncation, or other errors. It is desirable in a pipeline FFT network to approximate the value of a resultant because the input values may not be exact, approximations can be calcualted faster than exact results, and the circuits are less complex.

The magnitude of a resultant in a radar signal processor is typically compared to a threshhold voltage to determine the presence of a target. The threshhold voltage is chosen to provide a high probability of target detection with a low probability of false alarms caused by spurious transients, usually noise. The signal-to-noise ratio (S/N) of a target signal required to provide a given probability of detecting the target determines the maximum permissible S/N loss. Part of the S/N loss will be the error in the approximation of the resultant.

The determination of the maximum of $I + Q/4$, $3(Q + I)/4$, and $Q + I/4$ can be made by comparing the values of $I$ and $2Q$ and of $Q$ and $2I$ as shown in the following relationships. ($I$ and $Q$ are magnitudes only. The colon indicates a relationship of equal to, less than, or greater than.)

|    |              |   |              |
|----|--------------|---|--------------|
| 1. | $I+Q/4$      | : | $Q+I/4$      |
|    | $I$          | : | $3Q/4+I/4$   |
|    | $3I/4$       | : | $3Q/4$       |
|    | $I$          | : | $Q$          |
| 2. | $3(I+Q)/4$   | : | $I+Q/4$      |
|    | $3I/4+Q/2$   | : | $I$          |
|    | $Q/2$        | : | $I/4$        |
|    | $2Q$         | : | $I$          |
| 3. | $3(I+Q)/4$   | : | $Q+I/4$      |
|    | $3Q/4+I/2$   | : | $Q$          |
|    | $I/2$        | : | $Q/4$        |
|    | $2I$         | : | $Q$          |

Figure 1:
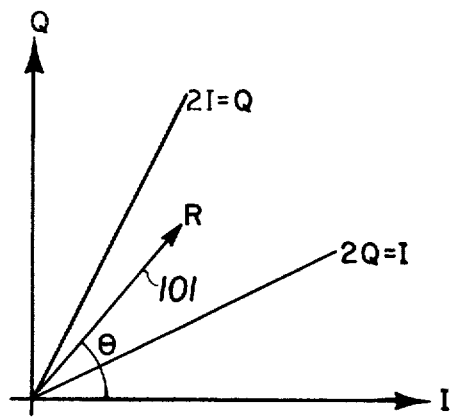
FIG. 1 is a Cartesian quarter section representing positive values of $I$ and $Q$.

FIG. 1 is a diagram of the positive $I$-$Q$ plane divided into three regions by the plots of $2I=Q$ and $2Q=I$. A typical resultant 101 is shown with magnitude $R$ and angle $\theta$. In region 1 of FIG. 1, $2I < Q$ and, consequently, $I < Q$. By relation 3 supra, $3(I+Q)/4 < Q+I/4$ and by relation 1, $I+Q/4 < Q+I/4$. Therefore, in region 1, $\sqrt{(I^2+Q^2)} \doteq Q+I/4$ for all $I$ and $Q$.

Similarly, in region 2, $2I > Q$ and $2Q > I$ so that by relations 3 and 2, respectively, $\sqrt{(I^2+Q^2)} \doteq 3(I+Q)/4$.

In region 3, $2Q < I$ and $I > Q$ so by relations 2 and 1, respectively, $\sqrt{(I^2+Q^2)} \doteq I + Q/4$.

Letting R represent the output signal from the approximator and $V$, an input variable, then
$R = \sqrt{(I^2+Q^2)}$
$I = V \cos \theta$
$Q = V \sin \theta$
$\theta = \arctan(Q/I)$ Region 1: $R \doteq V(\cos \theta + 0.25 \sin \theta)$, $0 < \theta < \arctan 0.5$   (1)

Region 2: $R \doteq 3V(\cos \theta + \sin \theta)/4$, $\arctan 0.5 < \theta < \arctan 2$   (2)

Region 3: $R \doteq V(\sin \theta + 0.25 \cos \theta)$, $\arctan 2 < \theta < 90°$   (3)

Equations (1) and (3) are equal over their respective ranges of $\theta$. Equation (2) is symmetrical about 45° over its range of $\theta$. The mean of $R$ is, therefore, $$E(R) = (4/\pi) \left[ \int_0^{\arctan 0.5} (\cos \theta + 0.25 \sin \theta) d\theta + (3/4) \int_{\arctan 0.5}^{\pi/4} (\cos \theta + \sin \theta) d\theta \right] \quad (4)$$

and the mean of the squares is $$E(R^2) = (16/\pi^2) \left[ \int_0^{\arctan 0.5} (\cos \theta + 0.25 \sin \theta)^2 d\theta + (9/16) \int_{\arctan 0.5}^{\pi/4} (\cos \theta + \sin \theta)^2 d\theta \right] \quad (5)$$

The variable $V$ is dropped in equations (4) and (5) since $E(R)$ and $E(R^2)$ are divided by $V$ to reference the result to unity gain.

The standard deviation of $R$ is
$$\text{STD DEV} = \sqrt{(E(R^2) - E(R)^2)}. \quad (6)$$

The mean output value $E(R)$ is found by equation (4) to be 1.03007. The STD DEV is found by equation (6) to be 0.01617.

The probability that $R$ is greater than a given threshold $T$ is $$\text{Prob}(R>T) = \iint_A p(\theta)\, p(V)\, d\theta dV \quad (7)$$

where $p(\theta) = $ uniform probability density function of $V$, and $A = $ area in the $V - \theta$ plane where $R > T$.

The probability density function of $V$ is
$p(V) = (V/\sigma_{in}^2) \exp(-V^2/2\sigma_{in}^2)$.

The noise is greater than $T$ when

| | |
|---|---|
| $V \geq T/(\cos\theta + 0.25\sin\theta)$ | $0 \leq \theta \leq \arctan 0.5$ |
| $V > T/.75 (\cos\theta + \sin\theta)$ | $\arctan 0.5 < \theta \leq (\pi/4)$ |

The probability of a false alarm can be reduced to $$\text{Prob}(R>T) = (4/\pi) \left\{ \int_0^{\text{ARCTAN } 0.5} \exp[-T^2/(2(\cos\theta + 0.25\sin\theta)^2 \sigma_{in}^2)] d\theta \right.$$

$$\left. + \int_{\text{ARCTAN } 0.5}^{\pi/4} \exp[-T^2/(2(0.75)^2(\cos\theta + \sin\theta)^2 \sigma_{in}^2)] d\theta \right\}$$

Numerical integration gives the values in Table I.

Table I.

| Probability of False Alarm Prob($R>T$) | Normalized Threshold ($T/\sigma_{in}$) |
|---|---|
| $10^{-3}$ | 3.8340 |
| $10^{-4}$ | 4.4297 |
| $10^{-5}$ | 4.9554 |
| $10^{-6}$ | 5.4316 |
| $10^{-7}$ | 5.8703 |
| $10^{-8}$ | 6.2793 |
| $10^{-9}$ | 6.6642 |
| $10^{-10}$ | 7.0288 |

The approximation has an RMS error, referenced to a unity gain, of 1.57 percent and a S/N loss, for $P_d = $ 90% and $P_{fa} = 10^{-6}$, of less than 0.03 $dB$, where $P_d = $ probability of detection of a target and $P_{fa} = $ probability of a false alarm, i.e., Prob($R>T$).

FIG. 1 also shows that the following relationships between $I$ and $Q/2$ and $Q$ and $I/2$ exist in the three regions.

| | | |
|---|---|---|
| 1. | In Region 1 | $I < Q/2$ and $Q > I/2$ |
| 2. | In Region 2 | $I > Q/2$ and $Q > I/2$ |
| 3. | In Region 3 | $I > Q/2$ and $Q < I/2$ |

Each relationship uniquely identifies one of the three regions and, therefore, MAX($I+Q/4$, $3(I+Q)/4$, $Q+I/4$). By making a simultaneous comparision of the two input signals ($I$, $Q/2$) and ($Q$, $I/2$), the appropriate approximation for $\sqrt{(I^2+Q^2)}$ can be uniquely determined.

Figure 2:
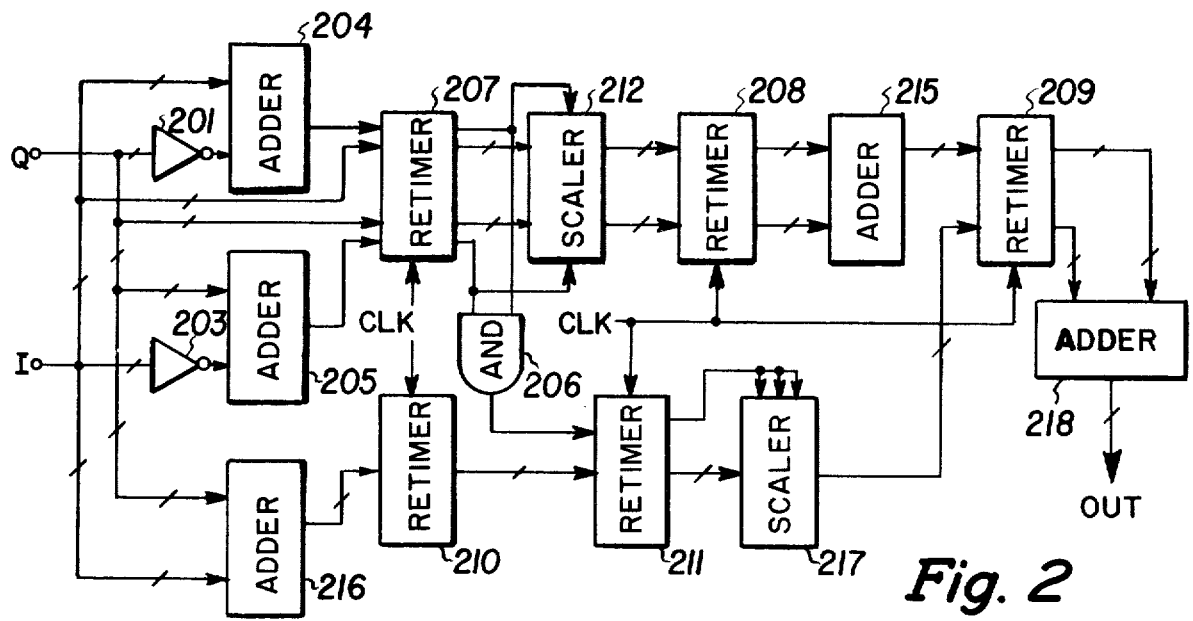
FIG. 2 is a logic diagram of a digital embodiment of the invention.

FIG. 2 is a block diagram of a preferred embodiment of the invention using digital techniques. The input signals to the circuit are $I$ and $Q$ and $I/2$ and $Q/2$, each of which is a binary word. In one embodiment, each binary word comprises nine bits, i.e., eight bits magnitude and one bit sign, in bit parallel form.

The signals $I/2$ and $Q/2$ are obtained by scaling the $I$ and $Q$ signals one bit toward the least significant bit by shifting. This shifting can be accomplished simply by coupling each signal to an input terminal one position toward the least significant bit. The $Q$ signals are inverted by a group of inverters 201 and the $I$ signals, by a group of inverters 203.

A first comparator 204 compares the relative values of $Q$ and $I/2$. The comparator 204 is shown implemented as an adder using the complemented $Q$ signals which causes the adder to operate as a subtracter, producing a difference $I/2-Q$. If $I/2$ is greater than $Q$, the output carry (or borrow) signal, $C_1$, will be a logical zero. If $Q$ is greater than $I/2$, the borrow output signal, $C_1$, will be a logical one.

Similarly, the comparator 205 will produce an output signal, $C_2 = 1$, when $Q/2$ is less than $I$ and another signal, $C_2 = 0$, when $I$ is less than $Q/2$. The output signals from the comparators 205 and 204 indicate the region in which the resultant falls as indicated by the relationships given above.

An output signal of $C_1 = 0$ from the comparator 204 indicates that the resultant is in region 3 and the value $C_1 = 1$ indicates that the resultant is in region 1 or 2. The signal $C_2 = 0$ from the comparator 205 indicates that the resultant is in region 1 and the signal $C_2 = 1$ indicates that the resultant is in region 2 or 3. Therefore, when $C_1 = C_2 = 1$, resultant falls in region 2. An AND gate 206 is responsive to the $C_1$ and $C_2$ signals to produce an output signal indicating that the resultant is in region 2.

The comparators 204 and 205 can be implemented by commercially available integrated circuits such as binary full adders type SN5483 or SN7483 (TI, Signetics, or National Semiconductor). Another type of commercially available unit from which the comparators might be constructed is type SN54181 or SN7481 (same manufacturers). These units can be coupled directly as comparators.

The retiming circuits 207–211 are merely registers for storing results from a previous stage in response to an input clock signal. The purpose of the retimers is to keep the system signals in proper time relation. As shown in FIG. 2, each retiming operation is controlled with relation to the clock. The explanation herein, however, will omit references to the clock in order to make the operation of the system more straightforward. Such retimers can be eliminated from the system by inserting appropriate delays in a manner which is well known in the art.

A scaler 212 operates to shift the bits of the $I$ and $Q$ signals in response to the $C_1$ and $C_2$ signals, respectively. Commercially available scalers such as the eight-position scaler 8243 (Signetics) can be used to implement the scalers in FIG. 2. Two such 8243 circuits would be required, one for the $I$ bits and another for the $Q$ bits. The scalers would be connected so as to shift the associated signals two bit positions toward the least significant bit when the shift signal is a logical one. This is equivalent to division by four.

The output signals from the scaler 212 are applied to the input terminals of an adder 215. The adder 215 can be implemented from commercially available integrated circuits discussed above. The input signals to the adder 215 will be $I$ and $Q/4$, $Q$ and $I/4$, or $I/4$ and $Q/4$ depending on whether $C_1 = 0$ and $C_2 = 1$, $C_1 = 1$ and $C_2 = 0$, or $C_1 = C_2 = 1$, respectively. The divisions are performed by the scaler 212 depending on the $C_1$ and $C_2$ signals.

An adder 216 produces an output signals of $(I + Q)/2$. These output signals are applied to a scaler 217, which operates either to scale the sum signals from the adder 216 completely out of range, producing an output signal of zero, or not to shift the output signals from the adder 216, producing output signals of $(I+Q)/2$. The scaler 217 can be implemented as a set of AND gates, each responsive to the output signals from the adder 216 and all enabled by an output signal from the AND gate 206 so that when the AND gate 206 is not activated, the AND gates of the scaler 217 are inhibited, producing a zero output signal. When the AND gate 206 is activated, the AND gates of the scaler 217 pass the output signals from the adder 216, producing output signals of $(I+Q)/2$. The output signals from the scaler 217 are coupled to one set of input nodes of an adder 218. The other input signals to the adder 218 are the output signals from the adder 215. In region 1, $C_1 = 1$ and $C_2 = 0$ so that the output of the AND gate 206 will be a logical zero and, consequently, the output signals from the scaler 217 will equal zero. The output signal from the adder 218 in this case will be equal to $I + Q/4$.

When the output signals $C_1 = 0$ and $C_2 = 1$, the AND gate 206 is disabled, producing an output signal of zero from the scaler 217, and the output signals from the adder 218 is equal to $I/4 + Q$.

When the output signals $C_1 = C_2 = 1$, the AND gate 206 is activated, producing output signals from the scaler 217 equal to $I + Q/2$. This value of $(I + Q)/2$ is added to $I/4 + Q/4$ by the adder 218 to produce output signals of $3(I + Q)/4$.

It is clear from the above description that the system of FIG. 2 will produce an output signal which is equal to MAX($I + Q/4, 3(I + Q)/4, Q + I/4$).

Figure 3:
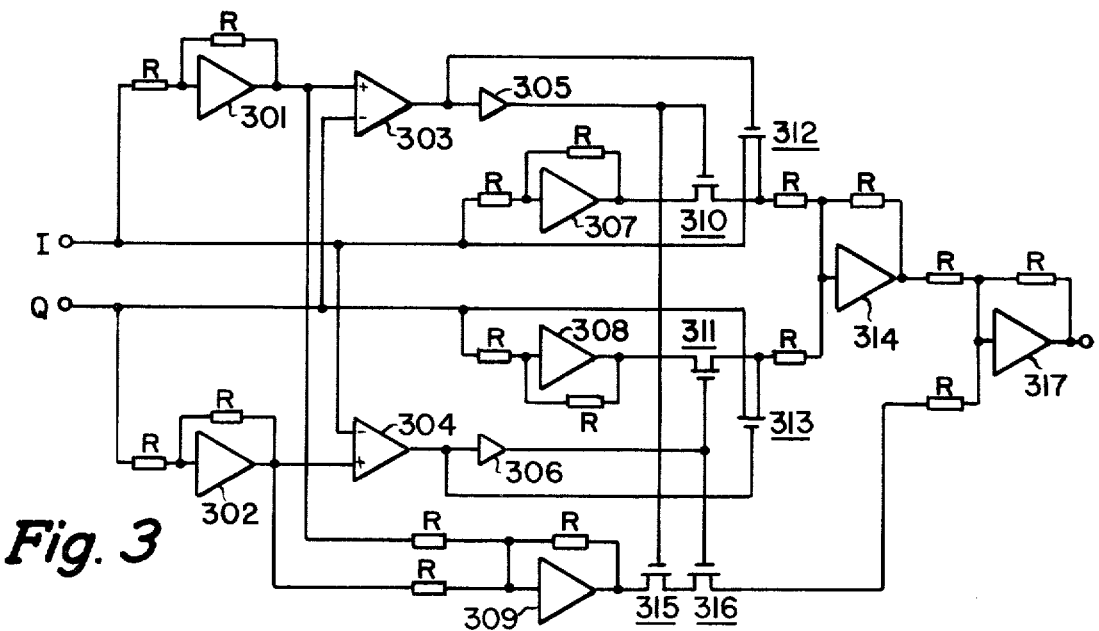
FIG. 3 is a schematic of an analog embodiment of the invention.

FIG. 3 shows an analog embodiment of the invention. Analog signals representing the magnitudes of $I$ and $Q$ are applied to scalers 301 and 302, respectively. The scalers 301 and 302 are operational amplifiers with feedback circuitry arranged so that the output signal from the operational amplifier is equal to half the value of the input signal. This is accomplished by making the feedback resistors one-half the value of the input resistors.

The input $Q$ signal and the $I/2$ signal from the scaler 301 are coupled to a comparator 303; the input $I$ signal and the $Q/2$ signal from the scaler 302 are coupled to a comparator 304. The comparators 303 and 304 are operational amplifiers having both inverting and noninverting inputs and no feedback resistor. Because of the high gain and absence of negative feedback, the output signals from the amplifiers swing from the maximum positive voltage to the maximum negative voltage, depending on the relative magnitudes of the input signals, with a voltage differential of only a few microvolts. The output signal of the comparator 303 is at maximum positive for $I/2>Q$, indicating the resultant is in region 3. The output signal from the comparator 303 is at maximum negative when $I/2<Q$, indicating the resultant is in region 1 or 2. Similarly, the output signal from the comparator 304 is maximum positive when $Q/2>I$, indicating the resultant is in region 1, and is maximum negative when $Q/2<I$, indicating the resultant is in region 2 or 3. The output signal from the comparator 303 is inverted by an inverter 305 and the output signal from the comparator 304 is inverted by an inverter 306.

The $I$ signal is also applied to a scaler 307 which is feedback coupled to produce an output signal equal to $I/4$. In a similar manner, the $Q$ signal is coupled to a scaler 308 which is feedback coupled to produce an output signal equal to $Q/4$. The feedback resistors are one-fourth the value of the input resistors.

The $I/2$ and $Q/2$ signals from scalers 301 and 302, respectively, are applied to an adder 309 which is feedback coupled so as to produce an output signal equal to the sum of the input signals, i.e., $(I + Q)/2$. Both input resistors and the feedback resistor are equal values.

The $I/4$ signal from the scaler 307 is coupled to the input node of an FET switch 310 and the $Q/4$ signal from the scaler 308 is coupled to the input node of an FET switch 311. The input $I$ signal is applied to an FET switch 312 and the $Q$ signal, to an FET switch 313. The FET switches, which could be replaced by relays or similar switching devices, present a low impedance between the input and output nodes for a positive control voltage and a high impedance for a negative control voltage. The pair of FET switches 310 and 312 and the pair of FET switches 311 and 313 are arranged so that each pair operates as a single-pole, double-throw switch controlled by the output signals from the comparators 303 and 304 and from the inverters 305 and 306. When the output signal from the comparator 303 indicates the resultant is in region 3, the $I$ input signal is coupled to the common output node of the first switch pair. When the resultant falls in region 1 or region 2, the $I/4$ signal from the scaler 307 is coupled to the common output node. Similarly, when the output signal from the comparator 304 indicates the resultant is in region 1, the input $Q$ signal is coupled to the common output node of the second switch pair. When the output signal from the comparator 304 indicates the resultant is in region 2 or 3, the $Q/4$ signal from the scaler 308 is coupled to the common output node of the second switch pair.

The output signals from the switches are coupled to an adder 314. The output signal from the adder 314 will be $I + Q/4$, $Q + I/4$, or $(I + Q)/4$ depending on the output signals from the comparators 303 and 304. When the resultant is in region 1, the adder 314 will produce a $Q + I/4$ signal; when the resultant is in region 3, an $I + Q/4$ signal; and when the resultant is in region 2, an $(I + Q)/4$ signal.

The output signals from the inverters 305 and 306 each control an FET switch 315 and 316, respectively. When both inverters are producing positive output signal, the switches 315 and 316 are activated to couple the output signal from the adder 309 to one input node of an adder 317. The other input signal to the adder 317 is the output signal from the adder 314. When the comparators 303 and 304 indicate that the resultant is region 2, both switches 315 and 316 are activated, in which case the output signal from the adder 314 is $(I + Q)/4$ which is added to $(I + Q)/2$ signal from the adder 309. The resulting output signal from the adder 317 is $3(I + Q)/4$.

When the output signals from the comparators 303 and 304 indicate that the resultant is not in region 2, one of the FET switches 315 and 316 is not activated. The output signal from the adder 309 is thereby decoupled from the adder 317. The output signal from the adder 317 in that case is equal to the output signal from the adder 314, i.e., $I + Q/4$ or $Q + I/4$ depending on whether the resultant is in region 3 or in region 1 as determined by the combination of output signals from the comparators 303 or 304.

Various modifications in the systems and circuits and illustrated to explain the concepts and modes of practicing the invention might be made by those of ordinary skill in the art within the principle or scope of the invention as expressed in the appended claims.

What is claimed is:

1. The combination comprising:
    source means for providing first and second input magnitude signals;
    comparing means responsive to said first and second input signals for producing a first signal indicating that said second input signal is greater than half of said first input signal and a second signal indicating that said first input signal is greater than half of said second input signal;
    summing means responsive to the source means for producing an output signal representing half the sum of said first and second input signals; and
    means responsive to the comparing means and to the summing means for producing an output signal representing the value of said first input signal plus one-fourth the second input signal when said first signal from said comparing means is present and said second signal from said comparing means is absent, representing the value of said second input signal plus one-fourth the value of said second input signal when said first signal from said comparing means is absent and said second signal from said comparing means is present, and representing the value of three-fourths the sum of said first and second input signals when both said first signal and said second signal from said comparing means are present.

2. The combination comprising:
    source means for providing signals indicative of two values;
    first and second comparator means responsive to the source means for providing first and second output signals, respectively, each indicative of the relative magnitudes of one of the two values to half the other;
    scaler means responsive to the source means for producing quotient signals by dividing one of said values by four in response to said first comparator output signal and by dividing the other of said values by four in response to said second comparator output signal;
    first adder means coupled to said source means for producing output signals indicative of half the sum of the two values;
    second adder means responsive to said quotient signals from said scaler for producing signals indicative of the sum of said quotient signals;
    combining means coupled to said first and second comparator means for producing a signal of a first value when said first and second output signals from said first and second comparator both indicate one relation of said two values and for producing a signal of a second value when at least one of said first and second output signals from said first and second comparator means indicates the other relation of said two values;
    gating means coupled to said combining means and said first adder means for producing output signals representative of a value of zero when the output signal from said combining means has the first value and representative of the value of the output signals from said first adder means when the output signal from said combining means has the second value; and
    third adder means coupled to the second adder means and the gating means for producing output signals representative of the sum of the output signals from said second adder means and from said gating means.

3. The invention as claimed in claim 2
    wherein said first and second input magnitude signals are electrical signals representing binary numbers; and
    said scaler means includes a binary bit shift means for moving each bit signal of the signal to be divided to the second lower significance position.

4. The invention as claimed in claim 3 further including
    first retiming means for storing the first and second input signals and said first and second signals from said first and second comparator means;
    second retiming means for storing the output signals from said first adder means;
    third retiming means for storing the signals from said scaler means;
    fourth retiming means for storing the signals in said second retiming means; and
    fifth retiming means for storing the signals from said second adder means.

5. The invention as claimed in claim 4
    wherein said first and second comparator means each comprise subtractor means and said first and second output signals represent borrow signals from the most significant bit positions.

* * * * *